Oct. 2, 1951 E. H. SHAFF 2,570,164
POWER-OPERATED SCREW DRIVER
Filed Jan. 2, 1947
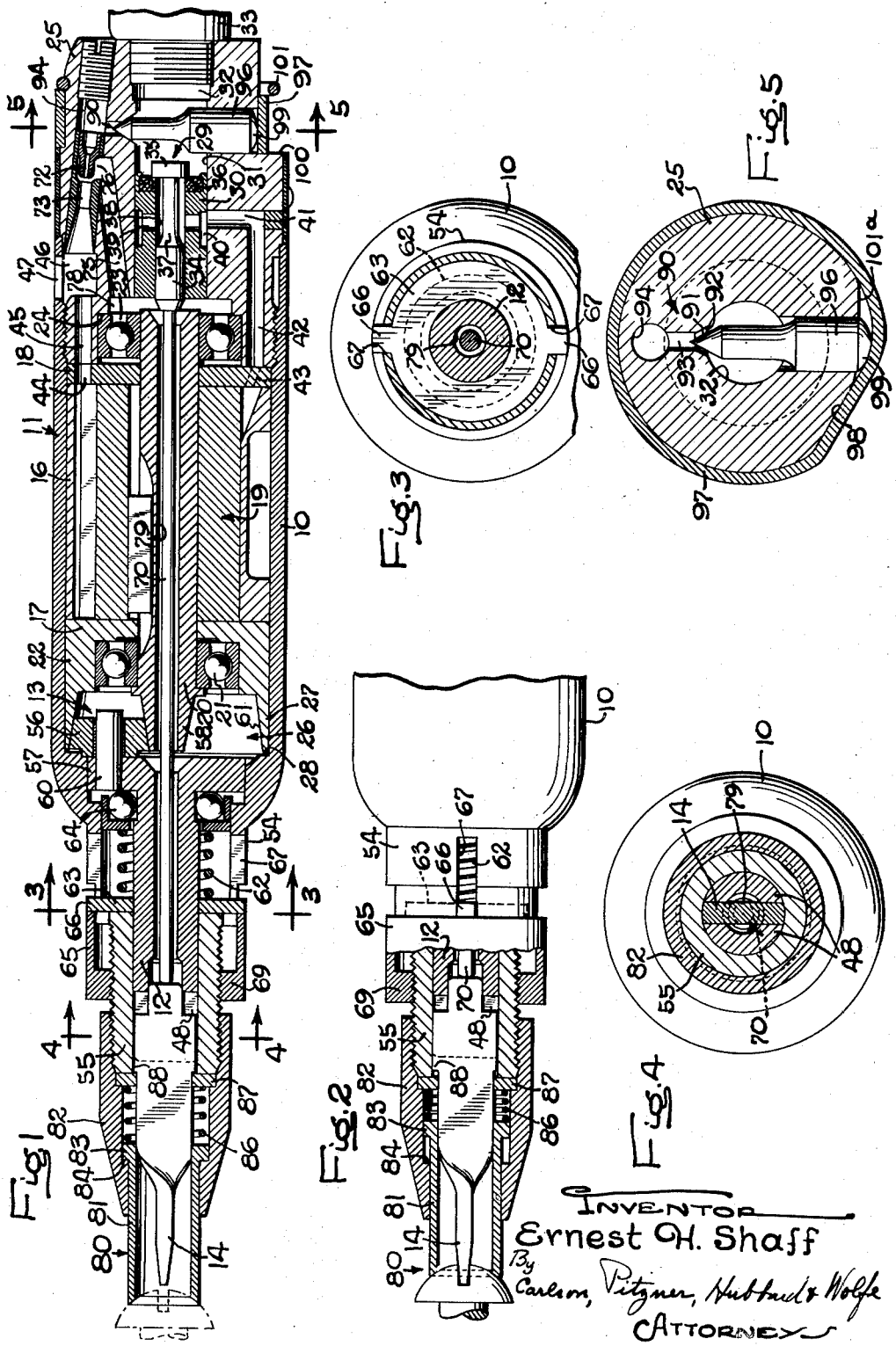
INVENTOR
Ernest H. Shaff
By Carlson, Pitzner, Hubbard & Wolfe
ATTORNEYS Patented Oct. 2, 1951

2,570,164

UNITED STATES PATENT OFFICE 2,570,164

POWER-OPERATED SCREW DRIVER

Ernest H. Shaff, Spring Lake, Mich., assignor to Keller Tool Company, Grand Haven, Mich., a corporation of Michigan Application January 2, 1947, Serial No. 719,803

7 Claims. (Cl. 144—32)

1

This invention relates to portable power driven tools such as screw drivers and nut runners, and has more especial reference to tools of this character which are actuated by air or other fluid pressure.

One object of the invention is to provide a portable power driven tool having a friction slip clutch drive for the tool spindle together with means accessible from the exterior of the tool for readily adjusting the pressure between the driving and driven members of the clutch.

Another object of the invention is to provide an air operated screw driver or nut runner having a suction device operative to pick up and retain the screws or nuts to be driven.

Yet another object is to provide an air driven tool having novel means by which the pressure of the tool on the work actuates a fluid pressure inlet valve to the motor.

Other objects and advantages of the invention will become apparent from the following detailed description taken in connection with the accompanying drawings, in which:

Figure 1 is a longitudinal sectional view taken generally along the axis of a tool embodying the present invention.

Fig. 2 is a fragmentary plan view of the clutch adjusting means and showing in section the forward end of the tool in the operation of picking up a screw.

Figs. 3, 4 and 5 are transverse sectional views taken respectively along the lines 3—3, 4—4 and 5—5 of Fig. 1.

As illustrated in the drawings, the exemplary form of the invention is shown embodied in a portable pneumatic screw driver comprising a generally cylindrical main casing 10 having a rotary pneumatic motor 11 for driving a spindle 12 through the medium of a drive mechanism including a friction slip clutch 13. In the embodiment shown the front end of the spindle 12 is constructed for driving engagement into a screw driving bit 14.

The motor 11 comprises a casing formed by a sleeve 16 having an eccentric opening therein and circular disks 17 and 18 abutting against flattened edges at opposite ends thereof, and a radially slidable vane type rotor 19 disposed for rotation between the disks. The rotor is mounted on a tubular drive shaft 20 extending axially through the rotor and projecting through the disks. The front end of the drive shaft is supported by a ball bearing 21 abutting the disk 17 and retained by an annular member 22 cast integral with the disk 17. The other end of the

2 shaft is supported by a ball bearing 23 abutting the disk 18 and retained in a counterbore 24 in a head 25 threaded into the housing at the end opposite the spindle.

The motor 11 is positioned in the casing 10 in spaced relation to the front end thereof so as to provide a chamber 26 for the friction slip clutch 13. Herein a sleeve 27 cast integral with the member 22 abuts an annular shoulder 28 in the casing. The head 25 screwed into the opposite end of the housing clamps the motor in position in the casing.

Pressure fluid is supplied to the motor 11 under the control of a poppet type valve 29 axially slidable in a casing 30 disposed in the forward end of a bore 31 in the head 25. The rear end of the bore forms a chamber 32 to which air is supplied through a fitting 33 in the outer end of the head 25.

The valve 29 has a forward cylindrical portion or plunger 34 slidable in the casing 30, a rear head 35 for engagement with a seat 36 of the rear end of the casing 30, and an intermediate or shank portion 37 of reduced diameter so as to form an annular chamber 38 normally closed at its rear end by the valve head 35. Intermediate the ends of the casing radial ports 39 open into an annular groove 40 which in turn connects with an angular motor supply passageway having a radial portion 41 and a longitudinal portion 42. The latter registers at its forward end with an inlet port 43.

Air is exhausted from the motor casing through exhaust ports 44 in the disk 18 and thence through one or more axially extending passageways 45 in the head 25 to a chamber 46 and finally to the atmosphere through ports 47.

The tool spindle 12 is journalled in a spindle housing 54 of smaller diameter than and projecting from the main casing 10. Herein the spindle is in the form of a hollow shaft in axial alinement with the tubular drive shaft 20 and having its outer end shaped to form jaws 48 to loosely hold the bit 14 while permitting the passage of air about the latter member for a purpose which will presently appear. The forward end of the spindle is journalled in a sleeve 55 rigid with the spindle housing and forming a forward extension thereof.

The driving connection between the motor 11 and the spindle 12 comprises in this instance a combined clutch and speed reducing mechanism disposed in the chamber 26 between the driving shaft 20 and the spindle 12. This driving connection is of the type that permits slippage between the drive member and the driven member when a predetermined load is applied to the spindle. As shown it comprises cone-shaped members or rollers 56 mounted in planetary relation on a spider 57 rigid with the spindle 12 and coacting with a cone-shaped drive member 58 rigid with the drive shaft 20. The rollers are journalled on pins 60 projecting axially toward the motor from the spider 57. As the rollers are caused to rotate about their respective axes by contact with the drive cone they are simultaneously caused to roll on an internal inclined surface 61 on the sleeve 27, the latter member being concentric with the drive cone.

An important feature of my invention resides in the provision of means conveniently accessible from the exterior of the tool for varying the frictional pressure between the drive member and the driven member of the drive mechanism. In this instance, a compression spring 62 encircling the spindle 12 is interposed between an adjustable abutment or collar 63 encircling the spindle, and a fixed abutment such as a ball thrust bearing 64. The force exerted by the spring is transmitted to the spider 57 through the thrust bearing 64, thereby urging the rollers 56 into frictional engagement with the tapered surfaces of the drive cone 58 and the stationary sleeve 27.

To adjust the frictional pressure between the surfaces of the frictionally engaged members of the clutch mechanism, the tension of the spring urging the clutch members into engagement may be changed by varying the axial position of the collar 63. For this purpose, I provide means including a sleeve or ring 65 conveniently accessible from the exterior of the tool. The ring encircles the outer end of the spindle housing and one end thereof abuts radial lugs 66 rigid with the collar 63 and projecting through longitudinally extending slots 67 in the spindle housing 54. At its other end the ring is constructed to form a nut 69 screw threaded upon the sleeve 55. It will be seen that by turning the ring the position of the collar 63 may be varied thereby changing the tension of the spring.

The spindle and its alined drive shaft are made hollow in order to provide a convenient control for the motor responsive to the pressure of the tool on the work. As shown, the control valve 29 is normally held against its valve seat 36 by air pressure in the chamber 32, and is opened by the axial movement of a rod 70 which extends longitudinally through the hollow drive shaft 20 and through the hollow drive spindle 12. One end of the rod abuts the rear end of bit 14 and the other end is secured to or integral with the valve plunger 34. Thus it can be seen that as pressure is applied to the spindle end of the tool, it will be transmitted through the rigid rod to the plunger thereby urging the head 35 axially away from the valve seat 36 to allow the passage of pressure fluid to the motor. Similarly the removal of the pressure from the spindle end of the tool allows the air pressure to again close the valve.

In accordance with my invention, the hollow drive shaft and spindle are also utilized to advantage as a part of an air operated means for picking up a screw, or nut and holding the same for application to the work. For this purpose, when the tool is in operation air discharged through a jet nozzle 72 is utilized to produce a suction effect at the top end of the bit or other tool. As shown the nozzle 72 opens into a passageway 73 extending lengthwise of the head 25 and in communication with the exhaust chamber 46. It causes air to be sucked by Venturi action through a passageway 75 having one end in communication with a chamber 76 surrounding the nozzle 72. The other end of the passageway 75 communicates with a chamber 78 formed at the inner end of the head 25 by a counterbore concentric with but of smaller diameter than the bearing retainer bore 24. The chamber 78 is in communication with an annular passageway 79 formed about the valve operating rod 70 and extending through the tubular drive shaft 20 and spindle 12.

As herein shown, the forward end of the tool is constructed to provide a finder 80 for receiving a screw as air is drawn or sucked through the annular passageway 79. Herein the finder is in the form of a tube 81 encircling the bit 14 and in communication with the annular passageway 79. The tube 81 is slidably mounted in a tapered nosepiece 82 threaded on the sleeve 55, and one end of the tube has an annular flange 83 which abuts a shoulder 84 on the interior of the nosepiece to prevent withdrawal therefrom. (The other end of the tube is formed to receive round-headed screws more readily.) Normally, the outer end of the tube is forced to protrude beyond the end of the nosepiece by a compression spring 86. The latter encircles the bit and is interposed between the flange 83 and an abutment in the form of a collar 87 encircling the bit, urging the flange into engagement with the shoulder 84.

The collar 87 additionally serves to prevent withdrawal of the bit from the tool. Thus it provides a stop for engagement by a shoulder 88 on the shank of the bit 14.

A needle valve 90 in the air supply chamber 32 regulates the amount of live air passing through the nozzle 72 from the chamber 32, thereby controlling the amount of suction at the finder end of the tool. Herein the valve is disposed transversely of the head and has a tapered point or tip 91 coacting with a valve seat 92. The latter is formed by flaring the inner end of a radially extending passageway 93 connecting the chamber 32 with a chamber 94 at the rear of the jet nozzle 72. At its opposite end, the valve is enlarged to form a plunger 96 slidable in a transversely extending bore at the outer end of the head 25. This enlargement provides a surface area on which compressed air supplied to the chamber 32 can act to move the valve into open position.

For convenient adjustment of the valve relative to its seat, I provide a ring 97 encircling the head 25 and having a cam surface 98 (Fig. 5) for engagement with an exposed outer end 99 of the plunger 96. To open the valve the ring 97 is rotated, permitting the end of the plunger to be moved radially outwardly against the circular dwell surface of the ring 97. Similarly, to close the valve, the ring is rotated to move the cam surface 98 into engagement with the end 99 of the plunger 96 to force the latter radially inward. To guide the ring as the latter is rotated, one end engages an annular shoulder 100 on the head 25 while the opposite end abuts a split ring 101 mounted on the outer end of the head 25. To permit limited rotation of the flattened ring the head 25 is flattened at 101ª.

The operation of the tool will be apparent from the foregoing but may be summarized as follows: Preparatory to using the tool, the ring 98 is turned to adjust the needle valve 90 so that air will be discharged through the jet nozzle 72 thereby causing a suction of air through the annular passage 79 and the finder 80. The finder is then inserted into a container having a supply of screws and upon contact with the head end of the screw the suction at the finder end of the tool picks up and holds the screw in the proper position (Fig. 1).

With the screw thus held applied to the work endwise pressure is applied to the tool, causing the finder to telescope into the nosepiece 82, thereby bringing the bit into engagement with the head of the screw as shown in Fig. 2. Additionally, pressure on the finder urges the rod 70 axially rearward to open the valve 29, thereby admitting air to the motor to drive the tool spindle. So long as valve 90 remains open suction will be produced in the finder so as to render the latter effective to pick up screws.

When the driving torque on the screw has exceeded a predetermined maximum, the clutch drive 13 will slip so that the tool spindle will come to rest. The amount of torque to be applied to the screw can be quickly and easily changed by turning the adjusting ring 65, which is readily accessible from the exterior of the wool, thereby varying the tension on the spring 62.

I claim as my invention:

1. A portable pressure fluid operated tool having, in combination, a motor, a hollow spindle driven by said motor, a spindle housing, a finder for threaded elements to be driven, said finder being slidably mounted in said spindle housing, a valve controlling the flow of pressure fluid to said motor, a rigid member extending through said hollow spindle and forming therewith an annular passageway in communication with said finder, said member having one end operatively associated with said finder and the other end engaging the valve whereby axial pressure on the member will shift said valve, a chamber communicating with said finder through said annular passageway, and means for sucking air from said chamber.

2. In a pneumatic tool, the combination of a main housing, a pneumatic motor having a hollow drive shaft in said housing, a hollow spindle driven by said drive shaft, a spindle housing projecting from said main housing, a finder mounted for axial movement on said spindle housing and in axial alinement with said spindle, said drive shaft and spindle forming a passageway communicating with said finder, and means for producing suction on said finder including an air passage communicating with a source of air under pressure, a second passage leading from the first passage and connecting with said passageway to the finder, and an ejector nozzle in the first passage operative in the discharge of air therethrough to effect a withdrawal of air from the second passage.

3. In a portable pneumatic tool having a motor, means defining an air supply chamber for connection with a source of compressed air and communicating with said motor, a spindle driven by the motor, a tool on the spindle, a finder for threaded elements encircling the tool and open at its forward end, and means including an ejector for producing a suction on said finder, said ejector including a nozzle, an air supply chamber for the nozzle, and manually operable valve means controlling the supply of air from said motor supply chamber to said nozzle supply chamber including a member shiftable into different positions and acting in one of said positions to permit air pressure in said motor supply chamber to hold said valve means open and acting in another of said positions to hold said valve means closed.

4. In a portable pneumatic tool having a casing, a motor in the casing, said casing defining an air supply chamber for said motor, a spindle driven by the motor, a tool on the spindle, a finder tube encircling the tool, ejector means for producing a suction on the finder tube including a nozzle, an air supply chamber for the nozzle, a valve movable radially of the casing and controlling the delivery of air from said motor supply chamber to said nozzle supply chamber, and a rotary cam sleeve on said casing shiftable into different positions, said cam sleeve being operative in one of said positions to hold said valve closed and in another of said positions to permit opening of said valve.

5. In a pneumatic tool, the combination of a housing, a rotary driving motor in said housing having a drive shaft with an axial bore therethrough, a tool spindle forwardly of the drive shaft and having an axial passage communicating with said bore, a driving connection between said shaft and said spindle, a finder for threaded elements providing a forward suction finder chamber communicating with the forward end of said spindle passage, a driver for threaded elements slidable in said finder and having a driving connection with said spindle operative to permit the passage of air from said forward suction chamber to said spindle passage, valve means controlling the flow of pressure fluid to the motor and including a shiftable valve member, a rear suction chamber communicating with the rear end of the bore in the drive shaft, means operable upon admission of pressure fluid to the motor under control of said valve means to produce a suction in said chamber, and a motion-transmitting member interposed between said driver and said valve member and extending through the axially alined passage and bore in the spindle and drive shaft respectively whereby axial pressure applied to said driver may be transmitted to said valve member, said member being dimensioned with respect to the passage and the bore to permit the flow of pressure fluid between said chambers.

6. In a pneumatic tool, the combination of a motor, valve means controlling the supply of pressure fluid to said motor, a spindle driven by said motor, a spindle housing, a finder for threaded elements to be driven comprising a tube mounted for movement axially of said housing and normally open at one end for the reception of the head of a threaded element to be driven, means operative to exhaust air from said tube so as to cause such threaded element to adhere to the normally open end thereof, and means operative as an incident to the movement of said finder relative to said spindle housing to actuate said valve means including a valve operating member movable axially of said spindle.

7. A portable pressure fluid operated tool comprising, in combination, a pressure fluid operated motor, a tool spindle driven by the motor, a finder for threaded elements providing a chamber normally open at one side for the reception of a threaded element, valve means for controlling the supply of air to said motor including a supply chamber, and means including an ejector rendered operative upon the supply of air to said supply chamber to exhaust air from said finder chamber.

ERNEST H. SHAFF.

REFERENCES CITED

The following references are of record in the file of this patent:

UNITED STATES PATENTS

| Number | Name | Date |
|---|---|---|
| 1,748,961 | Risser | Mar. 4, 1930 |
| 1,824,399 | Graffious | Sept. 22, 1931 |
| 1,913,003 | Shaff | June 6, 1933 |
| 2,127,855 | Baumgratz et al. | Aug. 23, 1938 |
| 2,184,394 | Moretti | Dec. 26, 1939 |
| 2,252,598 | Jeffrey | Aug. 12, 1941 |
| 2,272,279 | Schindel | Feb. 10, 1942 |
| 2,327,704 | Snyder | Aug. 17, 1943 |